United States Patent
Cain

(10) Patent No.: US 7,945,673 B2
(45) Date of Patent: May 17, 2011

(54) REDUCED WIRELESS INTERNET CONNECT TIME

(75) Inventor: Stuart Cain, Cupertino, CA (US)

(73) Assignee: Hewlett-Packard Development Company, L.P., Houston, TX (US)

(*) Notice: Subject to any disclaimer, the term of this patent is extended or adjusted under 35 U.S.C. 154(b) by 2190 days.

(21) Appl. No.: 10/313,019

(22) Filed: Dec. 6, 2002

(65) Prior Publication Data

US 2004/0111516 A1    Jun. 10, 2004

(51) Int. Cl.
*G06F 15/16*    (2006.01)
(52) U.S. Cl. ....................................... 709/227
(58) Field of Classification Search .................... 709/227
See application file for complete search history.

(56) References Cited

U.S. PATENT DOCUMENTS

| | | | | |
|---|---|---|---|---|
| 6,157,941 A * | 12/2000 | Verkler et al. | ................ | 709/202 |
| 6,304,967 B1 * | 10/2001 | Braddy | .......................... | 713/150 |
| 2002/0010798 A1 * | 1/2002 | Ben-Shaul et al. | ........... | 709/247 |
| 2002/0146018 A1 * | 10/2002 | Kailamaki et al. | ............ | 370/401 |
| 2003/0204769 A1 * | 10/2003 | Coughlin | .......................... | 714/4 |
| 2004/0107267 A1 * | 6/2004 | Donker et al. | ................. | 709/218 |

OTHER PUBLICATIONS

Boonsrimuang et al. "Mobile Internet Navigation System." Jul. 2002. 5th IEEE International Conference on High Speed Networks and Multimedia Communications. pp. 325-328.*

* cited by examiner

*Primary Examiner* — Larry Donaghue
*Assistant Examiner* — Nicholas Taylor

(57) ABSTRACT

A method for reducing the connect time for server access by wireless devices connecting to the server via a gateway is described. A connection from the wireless device to the gateway is established and a request for information on the server is received from the wireless device and transmitted to the server. A determination is made that a response from the server is not forthcoming and a busy indicator response is transmitted to the wireless device. The connection between the wireless device and the gateway is terminated and the request to the server is retransmitted. In another embodiment, a response is received from the server and a determination is made that the received server response is not the requested information and a response is transmitted to the wireless device. The connection between the wireless device and the gateway is terminated and the request to the server is retransmitted.

5 Claims, 5 Drawing Sheets

REDUCED WIRELESS INTERNET CONNECT TIME

FIELD

The present invention relates to a method for reducing wireless internet connect time for wireless devices and an apparatus corresponding thereto.

BACKGROUND

A high-level block diagram of a network architecture, generally indicated by reference numeral 100, supporting wireless Internet, e.g. World Wide Web (WWW), services is depicted in FIG. 1. A wireless terminal 102, e.g. a wireless application protocol-enabled telephone, connects to a gateway 104, e.g., a WAP gateway conforming to the WAP standard, over a wireless connection 106, e.g. a radio frequency connection such as a digital or analog cellular connection, using a wireless connection protocol.

A wireless connection protocol, known as the wireless application protocol (WAP), specified by the WAP Forum Ltd. is the most popular standard defining the provision of Internet communications and advanced telephony services to wireless systems, e.g., phones, pagers, personal digital assistants, and other terminals. The WAP specification is available from the WAP Forum at www.wapforum.org.

Gateway 104, a computer system as is known in the art, receives requests from terminals, tracks terminal connections, and provides responses to terminals. The amount of time terminal 102 is connected to gateway 104 is defined as the connect time. Gateway 104 connects to a server 108, e.g. a web server, over a fixed connection 110, e.g. a telephone line, an Ethernet connection, an optical or fiber-optic connection, a satellite-based connection, or a microwave-based connection, using standard network protocols, e.g. TCP/IP. Server 108, a computer system as is known in the art, receives and responds to requests from gateway 104.

It is to be understood that multiple terminals, gateways, servers, and wireless and fixed connections are possible; however, for simplification purposes only a single instance of each is described.

Typically, a user using terminal 102 travels among locations and corresponding gateways, e.g. traveling from home to office a terminal can connect and disconnect with multiple gateways. Connection of the terminal 102 to gateway 104 enables a user to access the Internet, and more specifically the World Wide Web (WWW), using WAP capabilities of terminal 102. For simplicity of description, WWW service access will be used as a non-limiting example.

After a WAP terminal, i.e. terminal 102, establishes a wireless connection with gateway 104 and responsive to user manipulation of terminal 102, terminal 102 transmits a request, e.g. a WAP version of an HTTP request, to gateway 104 which in turn formats the WAP request as an HTTP request and transmits the HTTP request to a web server, i.e. server 108. In response to receiving an HTTP request, server 108 transmits an HTTP response to gateway 104 which in turn formats the HTTP response as a WAP response and transmits the WAP response to terminal 102.

Because WAP terminals differ from desktop and/or laptop computer systems, e.g. smaller screen size, lower resolution, and less processing capabilities, the protocol specified by WAP for requests and responses differs from the protocol specified by HTTP. For example, WAP requests and responses are shorter in length, less complex, and include minimal or no graphics in comparison to HTTP request and responses.

Additionally, the cost of connect time for a terminal 102 connecting to gateway 104 over wireless connection 106 is greater than the cost of connect time from gateway 104 to web server 108 over fixed connection 110. Because of the costly nature of the wireless connection 106, users of terminal 102 desire to minimize the amount of connect time used. Further impacting the cost of using terminal 102 to access the Internet, the response time for web server 108 to respond to a request from gateway 104 is unreliable. That is, there is no guarantee whether or how long web server 108 will take to respond to requests from gateway 104. Thus, there is a need in the art to reduce the cost of network access from wireless devices. Further, there is a need in the art to reduce the connect time for wireless devices accessing network resources.

SUMMARY

It is therefore an object of the present invention to provide a method and apparatus for reducing the cost of network access from wireless devices.

Another object of the present invention is to reduce the connect time for wireless devices accessing network resources.

The above described objects are fulfilled by retransmitting requests between the gateway and the server, e.g. the Internet, and by connection management between the gateway and terminal.

In a method aspect, the connect time for network access by wireless devices connecting to the server via a gateway is reduced by connection management and retransmitting requests between the gateway and the server. A connection from the wireless device to the gateway is established and a request for information on the server is received from the wireless device and transmitted to the server. A determination is made that a response from the server is not forthcoming and a busy indicator response is transmitted to the wireless device. The connection between the wireless device and the gateway is terminated and the request to the server is retransmitted. In another embodiment, a response is received from the server and a determination is made that the received server response is not the requested information and a response is transmitted to the wireless device. The connection between the wireless device and the gateway is terminated and the request to the server is retransmitted.

In a computer-readable medium aspect, the medium includes at least one sequence of machine executable instructions. The medium bears the executable instructions in machine form, wherein execution of the instructions by one or more processors causes the one or more processors to establish a connection between a wireless device and a gateway. Responsive to receiving a wireless device request for information on a server, the processor transmits the request to the server. Responsive to the transmitted server request, the processor receives a server response and determines that the received server response is not the requested information, transmits a response to the wireless device, and terminates the wireless device connection to the gateway and retransmits the server request.

Still other objects and advantages of the present invention will become readily apparent to those skilled in the art from the following detailed description, wherein the preferred embodiments of the invention are shown and described, simply by way of illustration of the best mode contemplated of carrying out the invention. As will be realized, the invention is capable of other and different embodiments, and its several details are capable of modifications in various obvious respects, all without departing from the invention.

BRIEF DESCRIPTION OF THE DRAWINGS

The present invention is illustrated by way of example, and not by limitation, in the figures of the accompanying drawings, wherein elements having the same reference numeral designations represent like elements throughout and wherein.

DETAILED DESCRIPTION

Figure 1:
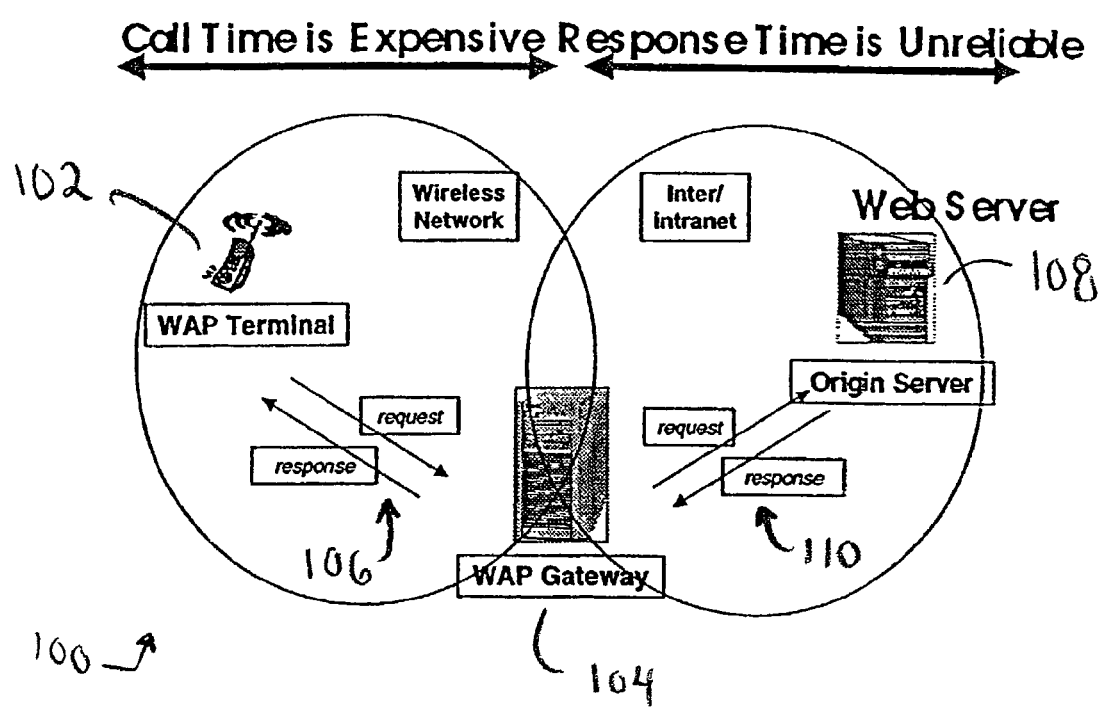
FIG. 1 is a high level block diagram of a network architecture.
Figure 2:
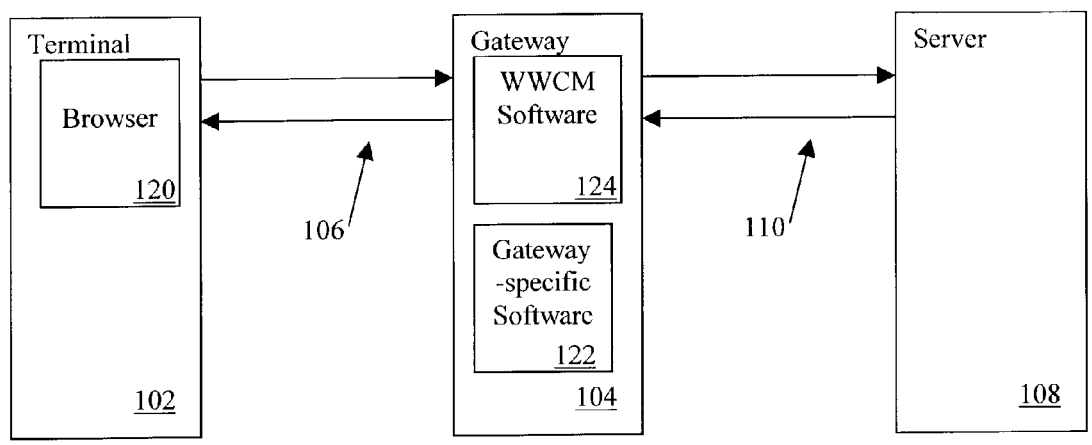
FIG. 2 is a high level functional block diagram of an embodiment of the present invention.

A preferred embodiment of the present invention is now described with reference to the block diagram of a typical WAP architecture depicted in FIG. 2. WAP terminal 102 includes a web browser, i.e. browser 120 designed for the limited physical constraints of terminal 102. The browser 120 is executable software to be executed by terminal 102 to enable a user using the terminal 102 to access the Internet, i.e. a user is able to browse the Internet using browser 120 executing on terminal 102. Browser 120 is a scaled-down, reduced functionality version of a typical desktop computer system web browser.

A user manipulates browser 120, executing on terminal 102, causing terminal 102 to initiate and set up a connection with a gateway 104 to enable the user to access Internet information, e.g. web pages and other network-based information. After a connection to gateway 104 is made, the user further manipulates browser 120 causing terminal 102 to transmit a request for information, i.e. Internet request or a request to access a user-specified Internet location, for example a uniform resource locator (URL), to gateway 104. As described above, the terminal-transmitted request is a WAP format request.

Gateway 104 includes gateway-specific software 122 and wireless web connection management (WWCM) software 124. Gateway-specific software 122, executed by gateway 104, receives (1) connection requests and Internet requests, i.e. WAP format Internet requests, from terminal 102 and (2) HTTP responses from web server 108. In response to receiving a connection request from a specific terminal, gateway 104 executes gateway-specific software 122 instructions causing the gateway to (a) store information about the terminal making the connection request, e.g. a unique terminal identifier and/or telephone number, in memory and (b) reply via a response over wireless connection 106 to the terminal confirming the connection.

After the connection has been made and in response to receiving an Internet request from terminal 102, gateway 104 executes WWCM software 122 instructions causing the gateway to format the received WAP format Internet request to be an HTTP request. Gateway 104 then executes WWCM software 124 instructions based on the received Internet request from terminal 102.

Gateway 104 executing WWCM software 124 instructions stores the Internet request, e.g. the URL, in memory. After storing the Internet request in memory, gateway 104 executes gateway-specific software 122 instructions causing the gateway to transmit the Internet request to web server 108 over fixed connection 110.

Web server 108 receives the Internet request, i.e. the HTTP-formatted WAP request, from gateway 104 over fixed connection 110 and responds by transmitting an HTTP response over fixed connection 110 to gateway 104. As is known to persons in the art, the HTTP response may include either the requested Internet information, e.g. a HTML-formatted file or an HTTP error identifier. The HTML-formatted file, i.e. a web page, returned depends on the content of the HTTP request received by the web server 108, as is known. An example of an HTTP error identifier is a resource not found error, e.g. a 404-file not found error.

Gateway 104 executing gateway-specific software 122 instructions receives the HTTP response from web server 108 and causes the WWCM software 124 instructions to be executed. It is to be understood that there are multiple ways in which gateway 104 can execute WWCM software 124 instructions, e.g. WWCM software 124 may be periodically checking a designated memory location for the HTTP response or the gateway-specific software 122 instructions may direct gateway 104 to begin executing WWCM software 124.

WWCM Software Functionality

Based on the (a) amount of time elapsed since the HTTP request was transmitted to web server 108 or (b) HTTP response received from web server 108, gateway 104 transmits a specific response to terminal 102. WWCM software 124 instructions executing on gateway 104 analyze the received HTTP response to determine whether the response is the requested Internet information or an error identifier.

No Response Received From Web Server

If the amount of time elapsed since the HTTP request was transmitted to web server 108 from gateway 104 meets or exceeds a specified value, the WWCM software 124 instructions executing on gateway 104 determine that a response from server 108 is not forthcoming, e.g. either (1) the web server 108 is very slow or busy or (2) the fixed connection 110 between gateway 104 and web server 108 is very slow or busy. If gateway 104 determines that a response is not forthcoming, WWCM software 124 instructions executing on gateway 104 cause the gateway to execute gateway-specific software 122 instructions transmitting a response to terminal 102 to inform the user that a response has not been received from web server 108 and gateway 104 will retransmit the previously received HTTP request from terminal 102 to web server 108. Further, the user of terminal 102 has the option of hanging up, i.e. disconnecting terminal 102 from gateway 104, or continuing to wait for a response from web server 108 via gateway 104.

If the user decides to hang up, the connect time ceases to accumulate and gateway 104 records the connect time for terminal 102 for billing purposes. Gateway-specific software 122 instructions executed by gateway 104 store a record of the disconnect to memory and cause the gateway 104 to execute WWCM software 124 instructions causing the gateway 104 to retransmit the previously received HTTP request to web server 108. In this manner, the user's connect time does not continue to increase and thereby lowers the overall cost to the user. Upon receiving an HTTP response, the process described above is repeated for receiving an HTTP response from web server 108.

If the user does not cause terminal 102 to disconnect, the connect time continues to accumulate and the gateway 104 retransmits the previously received HTTP request to web server 108. Upon receiving an HTTP response, the process described above is repeated for receiving an HTTP response from web server 108.

If, after a predetermined number of attempted retransmissions of the HTTP request, an HTTP response is not received from web server 108, gateway 104 discontinues transmission of the HTTP request and transmits a response to terminal 102, if the terminal is still connected to gateway 104, informing the user of the continued web server 108 response failure. The user may then choose to manipulate terminal 102 to disconnect the terminal from gateway 104, transmit a new HTTP request, or retransmit the previous HTTP request.

Response Received From Web Server

If an HTTP response is received from web server 108 prior to the elapsed time exceeding the specified value, gateway 104 determines if the received response includes requested Internet information or an error identifier.

Response Is Error Identifier

If the HTTP response received from web server 108 by gateway 104 is an error identifier, WWCM software 124 instructions executing on gateway 104 cause the gateway to execute gateway-specific software 122 instructions to transmit a response to terminal 102 informing the user that an error response has been received from web server 108 and that gateway 104 will retransmit the previously received HTTP request from terminal 102 to web server 108. The user of terminal 102 has the option of hanging up, i.e. disconnecting terminal 102 from gateway 104, terminating the previous HTTP request, transmitting a new HTTP request, or continuing to wait for the requested internet information from web server 108 via gateway 104.

In this case, if the user decides to hang up, gateway 104 ceases to accumulate connect time and records the connect time for terminal 102 for billing purposes. There is no further transmission of the user's previous HTTP request to web server 108. If the user terminates the previous HTTP request, terminal 102 remains connected to gateway 104 ready to transmit a new HTTP request or disconnect from gateway 104. If the user decides to transmit a new HTTP request, the process begins a new except that terminal 102 is already connected to gateway 104.

If the user decides to continue to wait for the requested internet information, the user has the option of either hanging up and waiting for gateway 104 to call back or remaining connected and continuing to wait for a response from a web server 108 via gateway 104. If the user decides to hang up and wait for gateway 104 to call back, the connection between terminal 102 and gateway 104 is terminated, gateway 104 ceases to accumulate connect time and records the connect time for terminal 102 for billing purposes, and gateway 104 retries the previously transmitted HTTP request to web server 108. Thereafter, gateway 104 continues to retry transmitting the HTTP request at a specified frequency until either an HTTP response having Internet information is received from web server 108 or a predetermined number of attempts have been transmitted without receiving an HTTP response having Internet information. If an HTTP response having Internet information is received by gateway 104 from web server 108, gateway 104 uses the previously stored terminal unique identifier to establish a connection with terminal 102, formats the HTTP response to be a WAP format response, and transmits the WAP response to the terminal for presentation to the user. It is to be understood by persons of skill in the art that the above-described call back from gateway 104 to terminal 102 can also be implemented using push techniques to push content to a device without a specific user request.

If the user decides to continue to wait, gateway 104 continues accumulating connect time for terminal 102 and retries the previously transmitted HTTP request to web server 108. The process continues as described above until either a determination that no response is forthcoming or an HTTP response is received from web server 108.

Response Includes Internet Information

If the HTTP response received from web server 108 by gateway 104 is the requested internet information, the WWCM software 124 causes the gateway-specific software 122 to transmit the requested information to terminal 102 over wireless connection 106. Gateway-specific software 122 instructions executed by gateway 104 formats the requested information, i.e. the HTTP response received from web server 108, as a WAP formatted response prior to transmission to terminal 102.

Request and Response Flow

Figure 3:
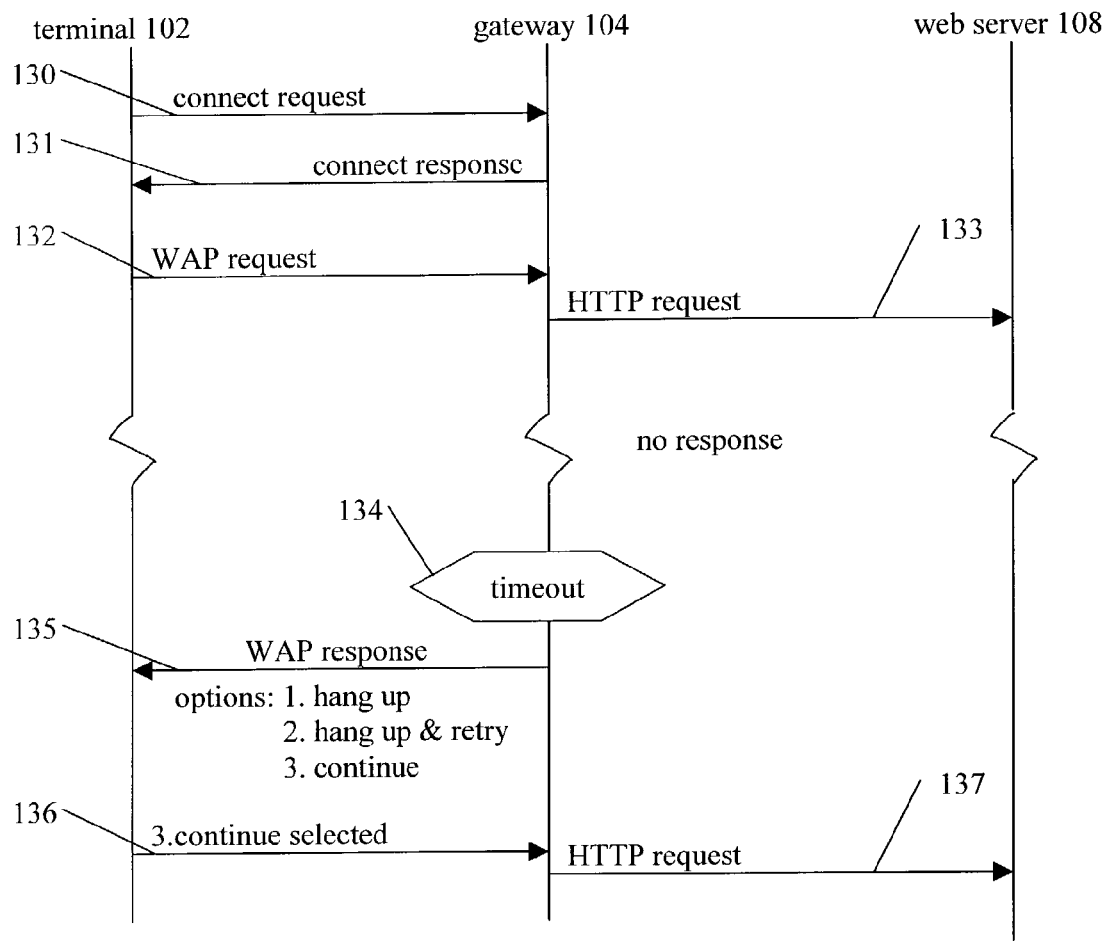
FIG. 3 is a first interaction diagram of an example of an embodiment of the present invention in operation.
Figure 4:
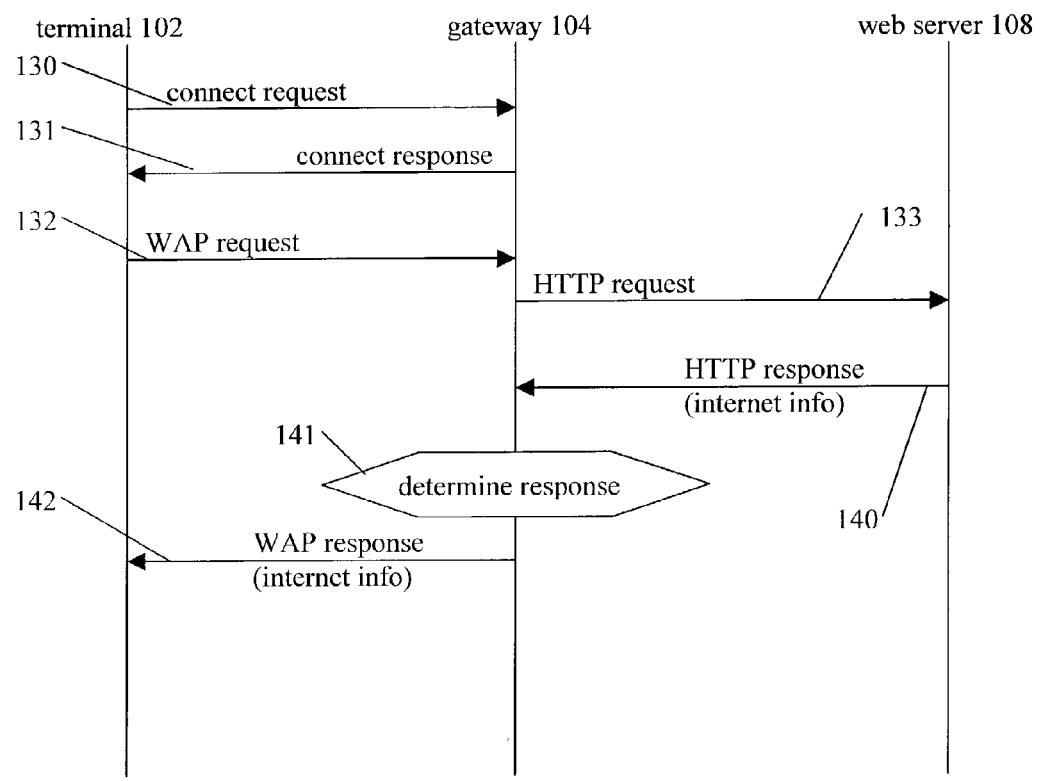
FIG. 4 is a second interaction diagram of an example of an embodiment of the present invention in operation.
Figure 5:
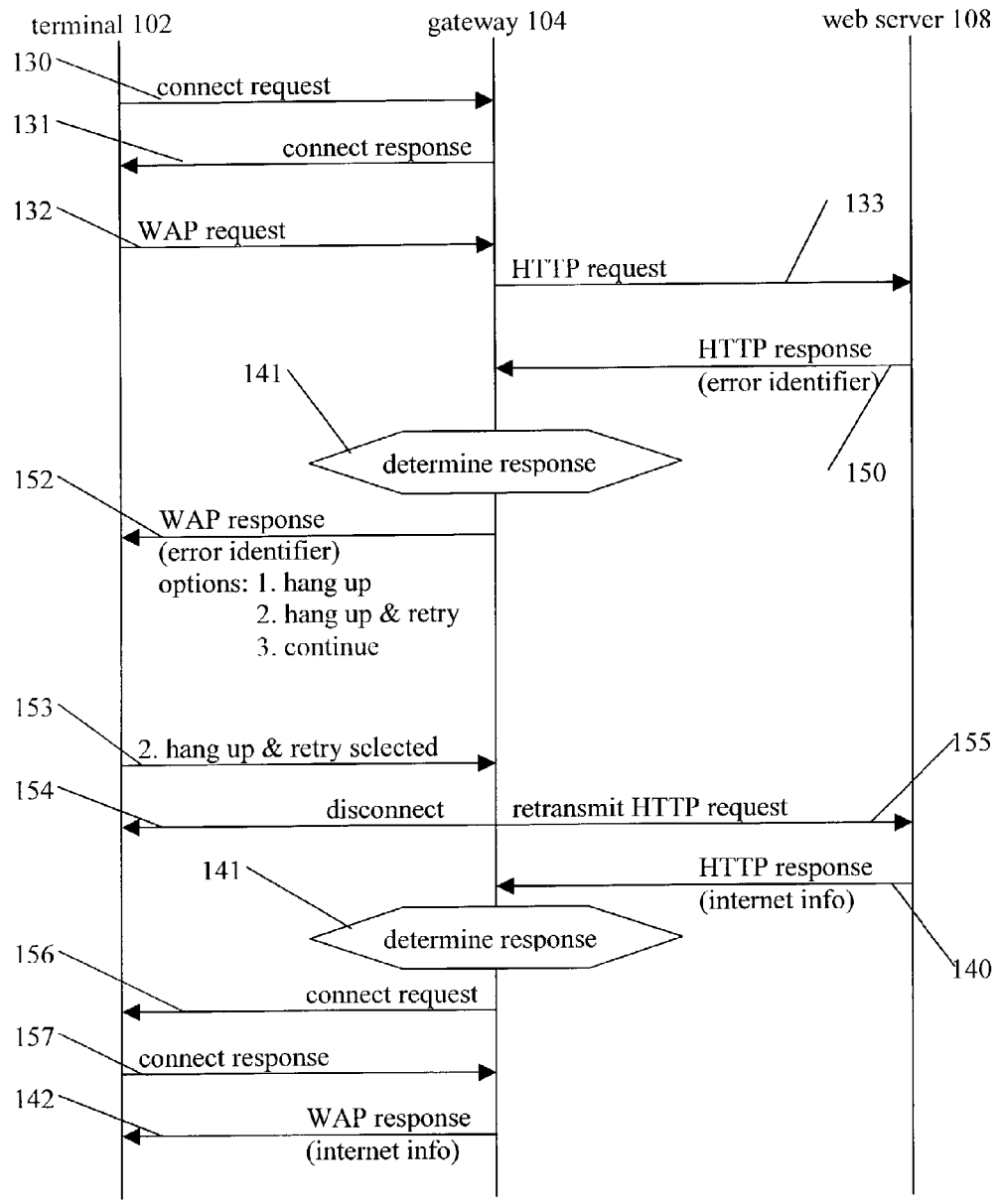
FIG. 5 is a third interaction diagram of an example of an embodiment of the present invention in operation.

FIGS. 3, 4, and 5 are high level interaction diagrams depicting the flow of requests and responses between terminal 102, gateway 104, and web server 108 according to the processes described above. With respect to each figure, time proceeds down the page from top to bottom.

FIG. 3 depicts an example of the responses and requests transmitted between terminal 102, gateway 104, and web server 108 when no response is forthcoming from a web server 108 in response to a terminal-originated request, as described above. In accordance with FIG. 3, a connect request 130 is transmitted from terminal 102 to gateway 104 responsive to user manipulating terminal 102. Gateway 104 responds to connect request 130 by transmitting a connect response 131 to terminal 102 thereby establishing a wireless connection 106 between terminal 102 and gateway 104.

After the wireless connection is established, the user manipulates terminal 102 causing terminal 102 to transmit a WAP request 132 to gateway 104. Gateway 104 receives the WAP request 132, formats the WAP request 132 as an HTTP request 133, and transmits the HTTP request 132 to web server 108 via fixed connection 110.

After a predetermined period of time has elapsed without a response, as indicated by the execution of timeout process 134 by gateway 104, gateway 104 transmits a WAP response 135 including three user selectable options to terminal 102 for presentation to the user. The options include hang up, hang up and retry, and continue. Responsive to the WAP response 135, the user selects one of the options by manipulating terminal 102 causing the terminal to transmit the user selection 136, e.g. option 3 continue, to gateway 104. Gateway 104 receives the user selection 136 and retransmits the previously transmitted HTTP request 133 to web server 108 as HTTP request 137. In this example, the cost to the user continues to increase because gateway 104 continues to accumulate connect time. If the user had selected the hang up and retry option, gateway 104 would cease to accumulate connect time and would retry the HTTP request without further increasing the connect time of terminal 102.

FIG. 4 depicts an example of the responses and requests transmitted between terminal 102, gateway 104, and web server 108 when a response having the Internet information requested is received from web server 108, as described above. In accordance with FIG. 4, a wireless connection 106 is set up by transmission of connect request 130 and connect response 131 between terminal 102 and gateway 104, a WAP request 132 is transmitted from terminal 102 to gateway 104, and an HTTP request 133 is transmitted from gateway 104 to web server 108 over fixed connection 110 as the interactions are described with respect to FIG. 3.

Differing from FIG. 3, in FIG. 4 the web server 108 transmits an HTTP response 140 including the requested internet information, i.e. the information corresponding to HTTP request 133, to gateway 104. After gateway 104 determines the type of the HTTP response received, as indicated by the execution of determine response process 141 by gateway 104, gateway 104 formats HTTP response 140 as a WAP response 142 and transmits the WAP response 142 to terminal 102 for presentation to the user.

FIG. 5 depicts an example of the responses and requests transmitted between terminal 102, gateway 104, and web server 108 when a response having an error identifier is received from a web server 108, as described above. In accordance with FIG. 4, a wireless connection 106 is set up by transmission of connect request 130 and connect response 131 between terminal 102 and gateway 104, a WAP request 132 is transmitted from terminal 102 to gateway 104, and an HTTP request 133 is transmitted from gateway 104 to web server 108 over fixed connection 110 as the interactions are described with respect to FIG. 3.

Differing from the interaction diagram depicted in FIG. 4, in FIG. 5 the web server 108 transmits an HTTP response 150 including an error identifier, e.g. a 404-file not found error, to gateway 104. After gateway 104 determines the type of the HTTP response received, as indicated by the execution of determined response process 141 by gateway 104, gateway 104 transmits a WAP response 152 including three user selectable options to terminal 102 for presentation to the user. The options include hang up, hang up and retry, and continue.

Responsive to the WAP response 152, the user selects one of the options by manipulating terminal 102 causing the terminal to transmit the user selection 153, i.e. option 2 hang up and retry at a later time, to gateway 104. Gateway 104 receives the user selection 153, disconnects terminal 102 from gateway 104 by transmitting disconnect 154, and ceases to accumulate connect time for terminal 102. Further in response to receipt of user selection 153, gateway 104 retransmits the previously transmitted HTTP request 133 to web server 108 as HTTP request 155.

In response to HTTP request 155, web server 108 transmits an HTTP response 140 including the requested internet information, i.e. the information corresponding to HTTP request 133, to gateway 104. After gateway 104 determines the type of the HTTP response received, as indicated by the execution of determine response process 141 by gateway 104, gateway 104 transmits a connect request 156 to terminal 102 over wireless connection 106. In response to receiving the connect request 156, the user manipulates terminal 102 to transmit a connect response 157 to gateway 104 thereby reestablishing the connection between terminal 102 and gateway 104. After the connection is established, gateway 104 transmits the WAP response 142 to terminal 102 for presentation to the user. In this example, the user has reduced the connect time used to obtain the requested Internet information.

It will be readily seen by one of ordinary skill in the art that the present invention fulfills all of the objects set forth above. After reading the foregoing specification, one of ordinary skill will be able to affect various changes, substitutions of equivalents and various other aspects of the invention as broadly disclosed herein. It is therefore intended that the protection granted hereon be limited only by the definition contained in the appended claims and equivalents thereof.

For example, other Internet and network services and resources can be accessed using an embodiment of the present invention. File transfer, electronic mail, and messaging services are examples of additional services. Further, server 108 can be a file server, electronic mail server, or other type of server.

What is claimed is:

1. A method for reducing wireless device connect time to obtain server information, comprising:
   establishing a wireless device connection to a gateway;
   receiving a wireless device request by the gateway for information on the server;
   transmitting the request by the gateway to the server;
   determining that a server response has not been received by the gateway and transmitting a busy indicator response to the wireless device by the gateway;
   and retransmitting the request to the server after terminating the wireless device connection to the gateway.

2. The method as claimed in claim 1, wherein the step of terminating the connection is performed by the gateway.

3. The method as claimed in claim 2, wherein the step of terminating the connection is performed by the gateway in response to receiving a request from the wireless device (1) to terminate the connection and (2) retry the request.

4. The method as claimed in claim 1, further comprising the step of: repeating the determining step.

5. The method as claimed in claim 1, wherein the receiving a wireless device request comprises receiving a wireless application protocol format request.

* * * * *